US007321300B2

(12) United States Patent
Friedrich et al.

(10) Patent No.: US 7,321,300 B2
(45) Date of Patent: Jan. 22, 2008

(54) SECURITY DEVICE FOR A TRANSPONDER (75) Inventors: Ulrich Friedrich, Ellhofen (DE); Dirk Ziebertz, Eberstadt (DE)

(73) Assignee: Atmel Germany GmbH, Heilbronn (DE)

( * ) Notice: Subject to any disclaimer, the term of this patent is extended or adjusted under 35 U.S.C. 154(b) by 289 days.

(21) Appl. No.: 11/105,551

(22) Filed: Apr. 14, 2005

(65) Prior Publication Data
US 2005/0231369 A1 Oct. 20, 2005

(30) Foreign Application Priority Data
Apr. 14, 2004 (DE) ............ 10 2004 018 557
Feb. 5, 2005 (DE) ............ 10 2005 005 436

(51) Int. Cl.
*G08B 1/08* (2006.01)
(52) U.S. Cl. .................. 340/539.11; 340/572.1; 340/572.3
(58) Field of Classification Search ........... 340/539.1, 340/539.11, 572.1, 572.3, 572.4, 825.34, 340/5.3; 701/32, 34, 35; 235/462, 472, 235/492; 713/189
See application file for complete search history.

(56) References Cited
U.S. PATENT DOCUMENTS

| | | | |
|---|---|---|---|
| 5,345,231 A | | 9/1994 | Koo et al. |
| 5,640,002 A | * | 6/1997 | Ruppert et al. ........ 235/462.46 |
| 5,897,598 A | * | 4/1999 | Puetz ................... 340/5.27 |
| 6,340,116 B1 | * | 1/2002 | Cecil et al. ............... 235/492 |
| 6,445,282 B1 | * | 9/2002 | Wagner .................... 340/5.3 |
| 7,073,069 B1 | * | 7/2006 | Wasson et al. ............. 713/189 |
| 7,084,756 B2 | * | 8/2006 | Stilp ..................... 340/539.1 |
| 2002/0044595 A1 | | 4/2002 | Friedrich |
| 2002/0135478 A1 | | 9/2002 | Stegmeier et al. |
| 2003/0133435 A1 | | 7/2003 | Friedrich |

(Continued)

FOREIGN PATENT DOCUMENTS

DE 100 50 878 A1 5/2002

(Continued)

OTHER PUBLICATIONS

The Palomar project (PAssive LOng distance Multiple Access UHF RFID system); contributors: VTT, Idesco, Rafsec, Atmel Germany, Atmel Nantes; Deliverable D7, Version V2.1; Status: public. Date of publication: Nov. 1, 2002.

*Primary Examiner*—Van T. Trieu
(74) *Attorney, Agent, or Firm*—Geissler, Olds & Lowe, PLLC (57) ABSTRACT

A security device for a transponder with a kill and/or cloak function is provided. The security device includes a memory device, in which a first, open password is stored, an input, into which a second, secret password is coupled, a cryptologic device, which is connected to the input and generates a checksum from the second password, and a comparison unit, which compares the checksum and the first password and which upon an agreement generates a kill and/or cloak control instruction to activate and/or deactivate a kill and/or cloak mechanism, which can be tapped at an output. A method for configuring a security device and a method for operating a transponder, and a transponder having the security device are also provided.

24 Claims, 3 Drawing Sheets

U.S. PATENT DOCUMENTS

2003/0221114 A1  11/2003  Hino et al.
2004/0066278 A1   4/2004  Hughes et al.

FOREIGN PATENT DOCUMENTS

| | | |
|---|---|---|
| DE | 101 38 217 A1 | 3/2003 |
| DE | 102 04 317 A1 | 8/2003 |
| DE | 102 04 346 A1 | 8/2003 |
| EP | 0 473 569 A2 | 3/1992 |

* cited by examiner

SECURITY DEVICE FOR A TRANSPONDER

This nonprovisional application claims priority under 35 U.S.C. § 119(a) on German Patent Application Nos. DE 102005005436.6 and DE 102004018557.3, which were filed in Germany on Feb. 5, 2005 and Apr. 14, 2004, respectively, and which are both herein incorporated by reference.

BACKGROUND OF THE INVENTION

1. Field of the Invention

The present invention relates to a security device for a transponder having a security function, particularly with a kill and/or cloak function. The invention further relates to a method for configuring a security means, to a method for operating a transponder, and to a transponder.

2. Description of the Background Art

The invention falls within the realm of transponder technology and in particular within the field of contactless communication for the purpose of identification. Although it can be used in principle in any communication system, the present invention and its underlying problems are explained with reference to so-called RFID communication systems and their application. Here, RFID stands for "radio frequency identification." For a general background of this RFID technology, reference is made to the "RFID-Handbuch" [RFID Handbook] of Klaus Finkenzeller, Hanser Verlag, $3^{rd}$ updated edition, 2002 which has been published in English by John Wiley & Sons.

In passive and semipassive transponders, an electromagnetic signal transmitted by the base station is received and demodulated by the transponder. Passive transponders do not have their own energy supply, so that the energy required in the transponder for the demodulation, decoding, and processing of the received electromagnetic signal must be derived from this electromagnetic signal itself. In addition to the transfer of energy, a bidirectional data communication also occurs between the base station and transponder (via the so-called carrier signal).

Bidirectional data communication between the base station and transponder typically has an interrogation sequence and a response sequence. The basis for the bidirectional data transmission between the base station and transponder forms a so-called communication protocol, which specifies, in addition to the data information to be transmitted, also the control information for the data communication. An RFID communication protocol for data communication between a base station and transponder is described in the Unexamined German Patent Application DE 101 38 217 A1, which corresponds to U.S. Publication No. 20030133435.

A generic RFID method and system for bidirectional data communication is also the subject of the so-called Palomar Project, which was established by the European Commission as part of the so-called IST program. With respect to the content of this Palomar Project, reference is made to the relevant, generally available publication of Jan. 11, 2002, which was submitted as a working draft ISO 18000-6 to ISO/IEC JTC1/SC31.

For further background on bidirectional data communication between a base station and transponder, reference is made further to the Unexamined German Patent Applications DE 102 04 317 A1 and DE 100 50 878 A1 (which corresponds to U.S. Publication No. 2002044595), as well as DE 102 04 346 A1, and the European patent EP 473 569 B1 (which corresponds to U.S. Pat. No. 5,345,231).

During such data communication between a base station and transponder, depending on the application, a more or less large amount of data is exchanged between the base station and the transponder and is evaluated.

There is the need in many transponder applications to deactivate the transponder permanently or merely temporarily. In the following text, permanent deactivation will also be called the "kill function" and temporary deactivation, the "cloak function."

There can be many different reasons for these requirements for a transponder, therefore there is a need for a kill mechanism and/or a cloak mechanism. After temporary or permanent deactivation, the transponder is no longer capable of being addressed via an electromagnetic field transmitted by a base station and send modulated response signals back to the base station. It is also incapable of performing other actions such as, for example, a storage process or a programming process.

An area of application for transponders equipped with such a so-called kill functionality are, for example, one way transponders as are used, for example, in department stores for labeling unsold products and items. After these products are sold, the transponders contained therein should be removed as easily as possible, deactivated, destroyed, or made nonfunctional in some other manner. Another area of application is, for example, disposable packaging.

For reusable products such as, for example, reusable packaging, files, etc., this functionality would also be in fact conceivable but not as desirable as in the aforementioned disposable transponders. The cloak function is therefore used in these last named areas of application, thus, for example, in reusable packaging. This enables the user to identify the specific products, contained in the reusable packaging, according to their need, via an activated transponder. After this identification or alternatively after the removal of the respective products from the reusable packaging, the transponder contained in the reusable packaging can be temporarily deactivated, so that it does not pick up in an undesired manner a data communication with a base station in its vicinity.

This cloak functionality is also particularly suitable for fields of application in which the transponder is assigned to security-relevant products and thus also contains security-relevant information. In this case, the transponder can be deactivated temporarily, for example, when the specific security-relevant products are not to be read during this time period, because they are being transported, for example.

In an implementation of a kill function and/or cloak function in modern RFID systems, however, there are special requirements for these:

The most important criterion is the security of these functions; i.e., when a kill/cloak function is activated, it may not be circumvented;

It is also essential that an implementation of the kill/cloak function is as cost-effective as possible in order not to increase the cost of the transponder unduly thereby;

The function should be activatable as easily as possible, advantageously electronically with use of the transponder's protocol mechanism;

Finally it should be possible to check a successful activation of the kill/cloak mechanism and a successfully deactivation of the kill/cloak mechanism.

There are several possibilities for implementing a security device in modern transponders, which have a kill function and/or cloak function; some of these generally known security devices will be described briefly below.

The simplest but not necessarily the best option for implementing the indicated functionalities, is to remove (deactivate) the specific transponders from the corresponding packaging of the product and to apply them again if required (activation). Nevertheless, this requires extraordinary effort, particularly in the case of many products equipped with transponders, and is therefore not very feasible. Moreover, the transponders frequently cannot be removed, because they are embedded in the product or even are a component of these products.

Another option is to destroy the particular transponders permanently, for example, by mechanical destruction, by, for example, a defined burning out of the protection within the transponder (fuse mechanism), or also by destroying the transponder antenna. All mechanisms are based on the destruction of the function of the transponder. A problem, however, is a desired verification of whether inoperability of the transponder, which was associated with the destruction, was achieved. In this case, destructive interventions in the transponders are not suitable, because these can also be repaired, if desired, which is to be avoided as much as possible.

For the noted reasons, in modern RFID systems, equipped with a kill/cloak function, these functions of the transponder are initiated electronically.

According to a first method of this type, the kill function is activated by the deletion of at least part of the memory of the transponder, which immediately closes down the transponder. Moreover, a suitable bit, which signals the closing down of the transponder, is read by the transponder according to a POR process (POR=power on reset) or cyclically and stored in a flip-flop. The status of the flip-flop then blocks the further functionality of the transponder. A disadvantage of this solution, however, is that, for example, the flip-flop can lose its stored value due to operating voltage variations above the POR threshold, so that access to the transponder is again possible. This is a situation, however, that should be avoided as much as possible.

For these reasons, in modern transponders, the kill/cloak functions are activated by a transponder-internal protocol mechanism. In this case, preferably, a digital password is transmitted to the transponder at the protocol level, which is known only by the transponder, in addition to an authorized user, and typically cannot be read by the base station. If this password is transmitted to the transponder, the kill/cloak function is activated. A desired security can be set thereby depending on the bit width of the digital password.

However, this solution as well has significant disadvantages.

Ideally, the password should only be known to the authorized user who is authorized to activate and/or deactivate a kill/cloak function in a transponder. However, this password is also typically accessible to other individuals, in addition to the authorized user. This type of security sink results inevitably in that certain information must be divulged by the authorized user to the developer and/or manufacturer of the transponder equipped with such a security device for implementing the security system, for example, by an employed password and by specific circuitry design of a security device. Admittedly, these companies of course handle all of this information very confidentially, but an element of risk always remains that the confidential information reaches an unauthorized user. The authorized user, therefore, can never be totally certain that their password and therefore access to their security device is not also known by groups of other individuals and used by these other individuals.

Another problem is that users pragmatically tend to limit the total number of employed passwords in order to limit as much as possible their own logistic efforts, especially for reasons of cost. In addition, the length of a password is frequently determined by protocol or by the system. A limited number of passwords and/or a limited length of these passwords also make it easier for an unauthorized user to decode these passwords.

Moreover, in addition, the security level of this type of security device is fixed in each case by the protocol of the data transmission.

All in all, however, this means that the current, generally known security devices, which use a transponder-internal protocol mechanism for realizing the kill/cloak function, do not offer sufficient security, particularly for security-relevant applications. This is a situation that is not acceptable, especially in the case of security-relevant products, and is not accepted, most notably, by many customers of such products.

SUMMARY OF THE INVENTION

It is therefore an object of the present invention to provide a very secure deactivation of a transponder. In particular, besides a permanent deactivation (kill mechanism), a temporary deactivation (cloak mechanism), if required, is to be possible as well. Another object is for the function of the temporary and/or permanent deactivation to be made available by the authorized user to other users as well, as necessary, in a simple manner. A further object is for the password for the deactivation to be modifiable without a resulting restriction of security.

According to and example embodiment of the invention, a security device for a transponder is provided. The transponder includes a security function, especially having a kill and/or cloak function, a memory device, in which a first, open password is stored, with an input into which a second, a secret password can be coupled, and a cryptologic device, which is connected to the input and which generates a checksum from the second password. The transponder can also include a comparison device, which compares a checksum and the first password, and which upon their agreement generates a security control instruction, particularly a kill and/or cloak control instruction, to activate and/or deactivate a security mechanism, in particular a kill or cloak mechanism that can be tapped at an output.

Also, a method for configuring a security device is provided, in which, to increase security during operation of the security device, the internal connection of the cryptologic device has a more complex design.

A method for operating a transponder with a security device is provided, in which, for wireless data transmission from a base station to the transponder, a high-frequency electromagnetic carrier signal is provided, onto which information packets are modulated, wherein in each case an information packet can have a header section, a middle section, and a terminating end section, and wherein the second password is placed at a predetermined site within the information packet.

Further, a transponder with a security device for data communication with at least one base station is provided, whereby the transponder has a transmitting/receiving device for receiving high-frequency carrier signals from a base station, and a control device for controlling the data communication with the at least one base station.

A security system for permanent or temporary activation or deactivation of a transponder can still be secure enough against unauthorized users, but ineffective if this security system is known to an unauthorized user. An idea of the present invention is that, in particular, also the manufacturer of the specific transponder and thereby of the security system implemented therein does not know all of the information about this security system. In particular, the invention provides for the use of at least two different passwords, whereby at least one of these passwords is known only to the authorized user. The authorized user is, for example, the owner of the transponder, who purchases this transponder and/or the corresponding RFID system having this transponder from the manufacturer and operates it.

The first, open password, which therefore is known to the manufacturer and to the authorized user, is divulged to the manufacturer and, for example, stored in a memory device, specifically provided for this, in the transponder. A checksum, which is compared with the first password, is derived from the second, secret password, which is known only to the authorized user of the transponder and/or of the corresponding RFID system. During proper operation, i.e., during use by the authorized user, the first, open password and the checksum derived from the second, secret password are identical. A security control signal, by which the security mechanism, thus, for example, the kill mechanism and/or the cloak mechanism, is activated and/or also deactivated, is issued only if the first, open password and the checksum derived from the second, secret password are identical.

It is essential for the method of the invention that a checksum, which cannot be easily reconstructed by the manufacturer and/or an unauthorized user, is derived from the second password, which is known only to the authorized user. A cryptologic device, which generates the checksum from the second, secret password, is provided for this purpose according to the invention. This cryptologic device, whose approximate or precise construction is known, for example, only to the manufacturer and the authorized user, thereby generates from the secret second password, coupled on the input side, the checksum at the output side. The manufacturer in this case knows the checksum generated at the output side and the (approximately) circuitry effort of this cryptologic device. However, does not know the second, secret password, which continues to be known only by the authorized user.

The subject of the invention thus is a shared secret, whereby the authorized user divulges only a part of this secret and only to the manufacturer of the transponders and/or of the corresponding RFID system. A component of this secret divulged to the manufacturer is, on the one hand, the first, open password and, on the other, the hardware configuration of the cryptologic device and thereby of the security device as predetermined by the authorized user.

Advantageous embodiments and further improvements of the invention can be derived from the dependent claims and the description with reference to the drawing.

A cryptologic device in its simplest form can be a computational device for calculating the checksum, this calculation resulting from the more or less complex internal connection of the individual elements of the computational device. The internal connection in this case cannot be determined in a simple manner.

Because the structure of this cryptologic device is known only to the manufacturer, but not to an unauthorized user, it is almost impossible for the latter to reach the content of the second password and thereby to obtain access authorization for activating and/or deactivating the security device. The structure and function of this cryptologic device is configured in such a way that if the second, secret password on the input side and the precise structure of the cryptologic device are known, it is relatively simple to determine the corresponding checksum (forward calculation). In contrast, it takes extraordinary effort to determine the second, secret password if the checksum is known, because a backward calculation to determine the second, secret password, due to the more or less large number of possible permutations, depending on the structure of this cryptologic device, is possible only with extraordinarily high computation effort. This effort is at least considerably greater than the effort to determine the checksum from the second, secret password.

The cryptologic device in combination with the second, secret password thus forms the main component of the security mechanism.

Overall, this leads to a significant increase in the security level, because the manufacturer admittedly knows parts of the security device, in particular, the first, open password and the corresponding hardware connection of the cryptologic device. However, he does not have the essential component in the form of the second, secret password, which would make him able to operate the security device. This is even more difficult for an unauthorized user who knows only the second, open password, for example, by reading the memory. The unauthorized user, however, does not know the precise circuitry structure of the cryptologic device and the corresponding hardware configuration, so that it is almost impossible for him to gain access to the security device.

Depending on the complexity of the cryptologic device, therefore, the effort to determine the second, secret password is more or less great. This extraordinarily high computation effort is thereby typically not in proportion to the respective cost of the item to be protected, particularly if the unauthorized user cannot be certain that the corresponding transponders are the transponders with security-relevant information, as, for example, transponders for munitions or, for example, transponders without security-relevant information, such as, for example, transponders for consumer products. In this case, he would have to exert the same effort with each of these transponders to gain any access at all to the security device.

In addition, a control signal that activates and/or deactivates a kill or cloak mechanism can be derived in a very simple but nonetheless very effective manner by comparison of two passwords.

In a further example embodiment, the cryptologic device can be a computational device that calculates the checksum.

The cryptologic device can be implemented based on both hardware and on software, whereby in the case of a software solution it can also be placed, for example, in the base station.

The cryptologic device can be a linear feedback shift register or in short form an LFSR register. Depending on the complexity of this LFSR register, the effort to determine the second, secret password would be more or less great.

The cryptologic device and/or the LFSR register are a CRC register (CRC=cyclic redundancy check). Such a CRC register is implemented in any event in each transponder and can thus be used very advantageously in addition also for the security device of the invention for activating or deactivating a kill and/or cloak mechanism. Advantageously, no additional expenditure for circuit engineering is necessary, which makes it possible to realize the transponder very cost-effectively overall despite the increased functionality in combination with a very high security level. The use of a CRC register therefore economizes on chip areas and is thereby cost-effective.

A further increase in the security level of the security device of the invention can be realized as follows:

To increase the security level, the complexity of the cryptologic device can be increased, for example, by making the internal connection more complex.

In the case of a CRC register or an LFSR register, this can be realized, for example, by increasing the bit number. For example, even by expanding an 8-bit CRC register to a 16-bit CRC register, the computational effort necessary for a back calculation of the input signal and thereby the second, secret password would rise exorbitantly.

Frequently, expansion of the CRC register is not possible, however, because this is predefined, for example, by the application and by the protocol of the data transmission. A function equal to an expansion of the CRC register, however, also results when the CRC register is passed through repeatedly to obtain a checksum. Because the unauthorized user does not know how often a CRC register must be passed through to obtain the checksum, breaking through this security mechanism is made additionally difficult in this manner.

The cryptologic device can have at least one output port from which the checksum is derived. This output port, which can be at a specific site (tap) of the cryptologic device, for example, at a fixed given flip-flop of the LFSR register and/or CRC register, taps the checksum applied there, which then is compared with the first, open password in the comparison device. Because the unauthorized user does not know the precise position of the output port, the back calculation to the second, secret password is made more difficult for the user. This is made even more difficult if the tap occurs at a higher value flip-flop of the LFSR register and/or CRC register, because an unauthorized user in this case must back calculate all permutations resulting from the internal connection of the other flip-flops arranged before this flip-flop.

In addition to the use of a single output port for deriving the checksum, of course, several output ports and thereby several taps, which tap a specific signal at different sites of the LFSR register and/or CRC register, can also be used. The checksum is then determined by simple linking of these signals derived in this way. In addition, a checksum can be determined by a different linking of these different tapped signals.

Another possibility for increasing the security level is to provide at least one linking device in the cryptologic device for deriving the checksum. The linking device is connected with at least one tap of the cryptologic device, which links together the signals provided by the cryptologic device at the output side and generates the checksum therefrom.

The linking device has, for example, AND operations, OR operations, XOR operations, and/or modulo operations, etc. A linking device with a design as complex as desired can be provided particularly by individual employed operations (AND, XOR, modulo, etc.), the type of operation (crossover, parallel, in series, feedback, etc.), and the number of the employed operations.

The second, secret password used by the authorized user can essentially be present at any site within the protocol of a data transmission.

If the cryptologic device is designed as a CRC register, the second, secret password can be inserted into the region of the CRC protection field of the information packet. The second, secret password can be transmitted here to the transponder in addition or instead of the CRC information.

In a further example advantageous embodiment, the second, secret password can be placed in the area of the end section. This end section is frequently also called the EOT end section (EOT=end of transmission). The EOT end section in the case of the aforementioned Palomar system typically has two EOF symbols (EOF=end of file). A second command level can be inserted between these two EOF symbols. This level is generally used for control, for data transmission, or especially in the present case for the transmission of the second, secret password. The particular advantage of this application is that the protocol for the data communication need not be modified here, so that the authorized user can transmit the second, secret password if required, only in the area of the EOT end section between the two EOF symbols, without interfering with the data communication between the base station and transponder.

The second, secret password can also be placed in addition or alternatively in the header section of an information packet.

The authorized user can also make the second password available to other authorized users. For this purpose, for example, a central database can be provided in which the authorized user stores the second, secret password. Other users, who are empowered or authorized by the authorized user, can have access to the second, secret password by providing, for example, a specific address, a code word, or any other authentication to a central database. These other users, like the authorized user, now have access to the security device of the transponder and can operate the transponder, for example, by deactivating or activating the kill mechanism or cloak mechanism. This functionality is particularly advantageous especially if the transponder is intended for identification of security-relevant items and thus also has security-relevant information. The authorized user during transport of these items to other users can temporarily deactivate the function of the security device of a transponder by the just described method of the invention.

In a another example embodiment, the authorized user, who alone knows the second, secret password, transfers, for example, sells, the corresponding transponders and/or the items equipped with these transponders to a second authorized user. During this transfer, the first authorized user divulges the first, open and the second, secret password to the second authorized user with the transfer of the objects and/or the corresponding transponders, so that this second authorized user now can also operate the security device of the invention. However, the problem here is that in this case the first authorized user, who now should no longer be authorized, still knows the respective passwords, which is undesirable, and thereby has access to the security device of the respective transponders. To prevent this, the security device of the invention is configured so that an authorized user can also change the second, secret password.

For this purpose, the second authorized user provides a changed second password, from which a checksum is calculated based on the internal connection of the cryptologic device. This checksum likewise represents the first, open password. This changed first, open password is now stored in a memory device of the transponder. The first user is now no longer authorized and is also no longer capable of obtaining access to the security device of the transponder by means of the first and second passwords which he knows. The second now exclusively authorized user can now store the combination of the changed first and second passwords on his part in a central database and make them available to other users as necessary.

The second password can be changed and a changed checksum, which is then stored as the new first password in the memory device, is determined from the changed second password with use of the cryptologic device and/or a linking device.

The change of the second password is changed after a predetermined number of accesses to the security device, especially after each access to the security device.

The second password can be changed automatically through the use of a random number.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION

In the figures, the same or functionally identical elements, data, and signals, if not specified otherwise, are given the same reference characters.

Figure 1:
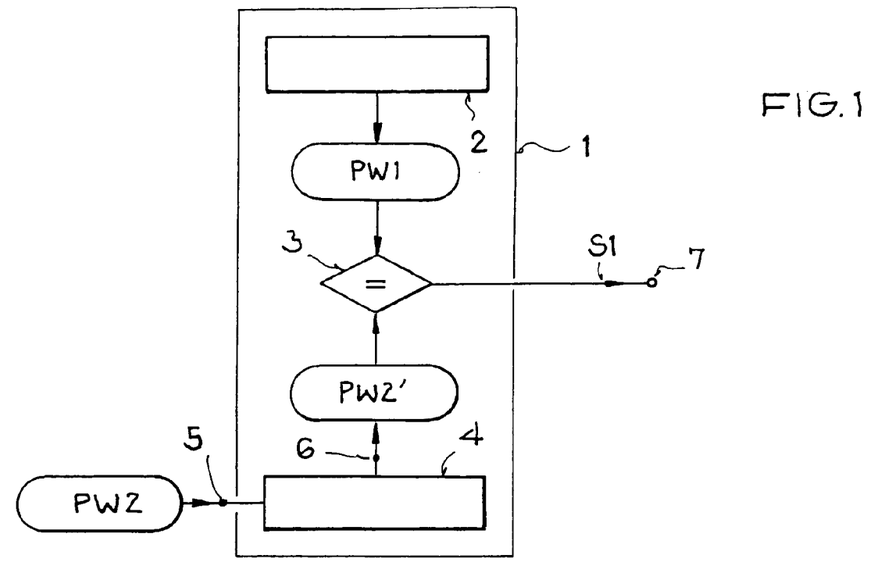
FIG. 1 is a block diagram of a method of the invention for activating a kill mechanism and/or cloak mechanism, according to an example embodiment of the present invention.

FIG. 1 illustrates a structure and operating principle of a security device according to an example embodiment of the present invention for activating and/or deactivating a kill mechanism or a cloak mechanism.

In FIG. 1, the security device of the invention is designated with the reference character 1. The security device 1 has a memory 2, a comparison device 3, and a cryptologic device 4.

The memory 2 can be any desired memory, for example, a common volatile or nonvolatile semiconductor memory, such as DRAM, SRAM, EPROM, EEPROM, etc., or a hardwired logic element having a memory functionality such as, for example, an FPGA or PLD circuit. The memory 2 can be made a component of the memory of a transponder or be separate from the security device 1. A first, open password PW1 is stored in the memory 2.

The comparison device 3 can be, for example, a conventional digital comparator. It would also be conceivable that the function of the comparison device 3 is carried out by a logic circuit provided in any event in a transponder or by a program-controlled device. The comparison device 3 can be connected to an output 7 of security device 1.

In the present example embodiment, it is assumed that the cryptologic device 4 is a 16-bit CRC register. The CRC register 4 is connected to an input 5 of the security device 1. A second password PW2, known only to an authorized user, can be supplied to the CRC register 4 via input 5. Based on an internal connection of the CRC register 4, which, for example, is a component of the CRC register provided in the transponder, a checksum PW2' is determined, which is derived from the second password and can be decoupled at tap 6 of the CRC register 4.

The precise structure and operating principle of this type of CRC register are generally known and described in detail, for example, in the aforementioned book by Klaus Finkenzeller, RFID-Handbuch [RFID Handbook], Hansa Verlag, particularly on pages 200 to 203, which corresponds to pages 196-200 of the English version published by John Wiley & Sons, and which is herein incorporated by reference.

Further, the first password PW1 is decoupled from memory 2 and compared in the comparison device 3 together with the checksum PW2' determined by the CRC register 4. If the password PW1 and the checksum PW2' agree, a control signal S1 is generated, which can be tapped at an output 7 of the security device 1.

According to the invention, both passwords PW1, PW2 are now coordinated by an authorized user in such a manner that with consideration of the internal connection of the CRC register 4, a checksum PW2' results, which corresponds to the first password PW1 stored in the memory 2; i.e., in the case of a coupled second password PW1, the following applies: PW1'=PW2.

Figure 2:
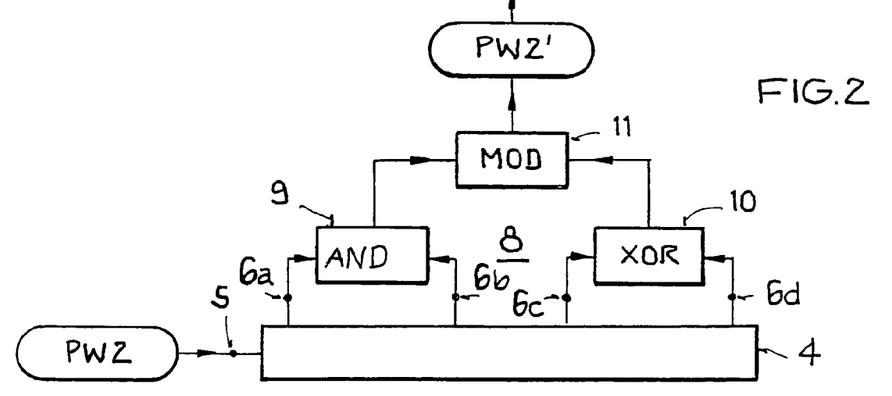
FIG. 2 is a block diagram describing another example embodiment of the present invention.

FIG. 2 shows a further improvement of the security device for deriving the checksum PW2' from the second, secret password PW2. In contrast to the exemplary embodiment in FIG. 1, the CRC register here has four taps 6a—6d, which tap off test signals at different sites of the CRC register 4.

A linking device 8 is provided to derive the checksum PW2' from these test signals. In the present exemplary embodiment, the linking device 8 has an AND operation 9, an XOR operation 10, and a modulo operation 11. The AND operation 9 is connected at the input side with taps 6a, 6b. The XOR operation 10 is connected at the input side with taps 6c, 6d. At the output side, the two linkages 9, 10 are connected to the inputs of a post-connected modulo operation 11, which provides a digital signal with the checksum PW2' on the output side.

It should be mentioned here that the embodiment in FIG. 2 was only presented by way of example and, of course, a more complex configuration can be used as desired, for example, by the introduction of additional operation elements or other taps.

Figure 3:
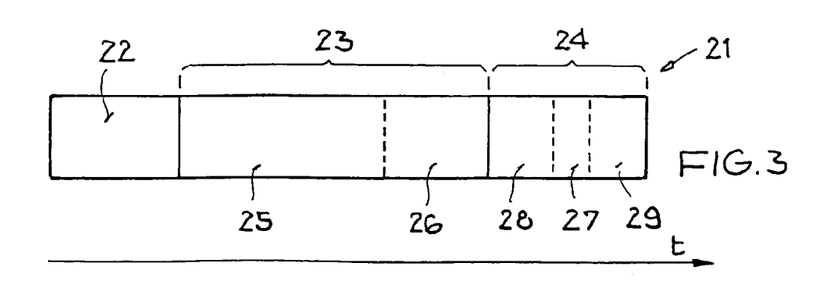
FIG. 3 illustrates a structure (protocol) of an information packet for data communication between a base station and transponder, in which a password is transmitted to activate a security device in the transponder.

FIG. 3 shows a structure of an information packet 21, as it is used for data communication between a base station and a transponder and as is known, for example, from the aforementioned Unexamined German Patent Application DE 101 38 217 A1, which corresponds to U.S. Publication No. 20030133435, which is incorporated herein by reference.

The information packet 21 has a header section 22, a middle section 23, and an end section 24.

For example, the number of data symbols to be transmitted and their identification are defined in the header section 22, in order to determine a precise position at which a specific field within the middle section 23 and/or the end section 24 begins. This can also occur in addition or alternatively via the appropriate command. In particular, the header section 2 can also specify reference times which are used for further data transmission in the middle section 23. The speed of the data communication between the base station and transponder is also established by the header section 22, for example, by a frequency of a free-running oscillator in the transponder. Moreover, the header section 22 can also contain control information for the fields, following header section 22, of the middle section 23 and the end section 24.

In this regard, reference is also made to the Unexamined German Patent Application DE 101 38 217 A1, particularly in regard to the control mechanism of the header section 22 of a data protocol, by which the number of symbols used for coding in the data region and their identification is defined.

The middle section 23 contains a data field 25 and a security field 26 immediately post-connected to said data field 25 (shown by the dashed line in FIG. 3), which is, for example, a CRC protection field 26. Coded data symbols are transmitted in the middle section 23. Depending on the desired application, the most diverse data structures (long command, short command) can be provided here, which will not be described in greater detail here, however.

The content of the end section 24 indicates to the specific receiver of the transmitted information packet 21 the end of the packet. In the case of, for example, the aforementioned Palomar system, the end section is designed as a so-called EOT end section and has precisely two EOF symbols 28, 29. Advantageously, an additional field 27 is provided between the two EOF symbols 28, 29 (shown by the dashed lines in FIG. 3).

According to the invention, this additional field 27 can now be provided to transmit the second password PW2, known only to the user, to the transponder, without interfering with the data communication. The authorized user by using any base station can now send a data sequence 21, shown according to FIG. 3, whereby in the area of the end section 24 the second, secret password PW2 is inserted into the additional field 27. In this manner, in addition to the command level present in any event in the data field 25, a second additional command level is created, which can be used for data communication or for the transmission of security-relevant information.

In addition or alternatively, password PW2 can also be placed in the CRC protection field 26 (not shown in FIG. 3). In addition or alternatively, password PW2 can also be placed in data field 25, for example, in its command field. In addition or alternatively, password PW2 can also be placed in the header section 22. In this case, the second password PW2 can be transmitted instead of or in addition to the data contained in the CRC protection field 26, in data field 25, and/or in the header section 22.

Figure 4:
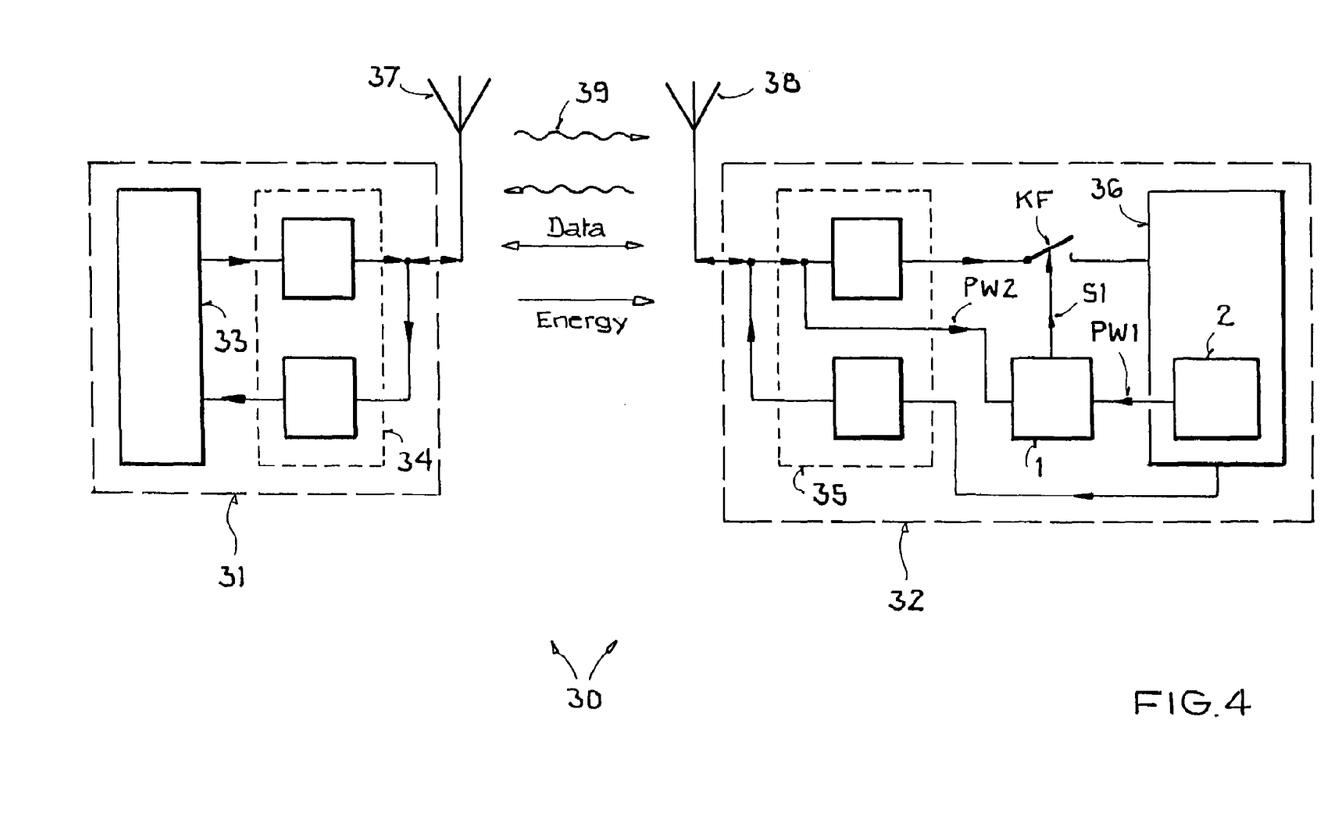
FIG. 4 is a block diagram of an RFID communications system having a base station and at least one transponder, which equipped with the security device of the invention, according to an example embodiment.

FIG. 4 shows a block diagram of an RFID communications system containing a base station and at least one transponder, equipped with a security device of the invention, for carrying out the method of the invention.

The communication system designated with reference character 30 has a base station 31 and a transponder 32. Base station 31 and transponder 32 have a communication link here.

Base station 31 includes a control device 33 for controlling the data communication and a transmitting/receiving device 34 (transceiver). In a similar way, transponder 32 has a transmitting/receiving device 35 (transceiver) and a control device 36. The transmitting/receiving device 34 of the base station 31 is configured to send high-frequency carrier signals 39 via antenna 37 to an antenna 38 of transponder 32.

The transponder 32 includes a security device 1, as was described, for example, in FIGS. 1 and 2. In FIG. 4, in contrast to the exemplary embodiment in FIG. 1, the memory 2, in which the password PW1 is stored, is designed as an external memory, which is placed, for example, in a control device 36 of the transponder 32.

The carrier signals 39, transmitted from base station 31 and containing the second, secret password PW2, are supplied to the security device 1 via a transmitting/receiving device 35, which, for example, is designed as an RSSI circuit (RSSI=received signal strength indicator). The security device 1 and/or the cryptologic device 4 contained therein derive the checksum PW2' therefrom. The security device 1 of the invention, provided that the first password PW1 read from the memory 2 and the determined checksum PW2' are identical, generates a control signal S1, by which the transponder 32 can be deactivated permanently or temporarily. This so-called kill functionality and/or cloak functionality is shown in FIG. 4 with the corresponding reference character KF.

The carrier signal 39 from a station 31 need not be used to activate the kill functionality and/or cloak functionality. Here, any signal can be used with the password PW2, provided it is recognized as the password by the transponder 32.

It is to be noted here that the depiction of the security device 1 in the transponder 32 is not intended to describe a precise depiction of the circuitry engineering, but only the embedding of the security device 1 into the transponder 32 and its function. It goes without saying that the function of the security device is provided at least in part in the control device 36 and/or in the receiving circuit, at least in regard to the memory 2 and the CRC device 4. In particular, the kill function KF need not be understood as a switch. Rather, this kill function KF can be designed as desired, thus, for example, as a controllable switch (for example, a MOSFET), as a fuse, etc.

Figure 5:
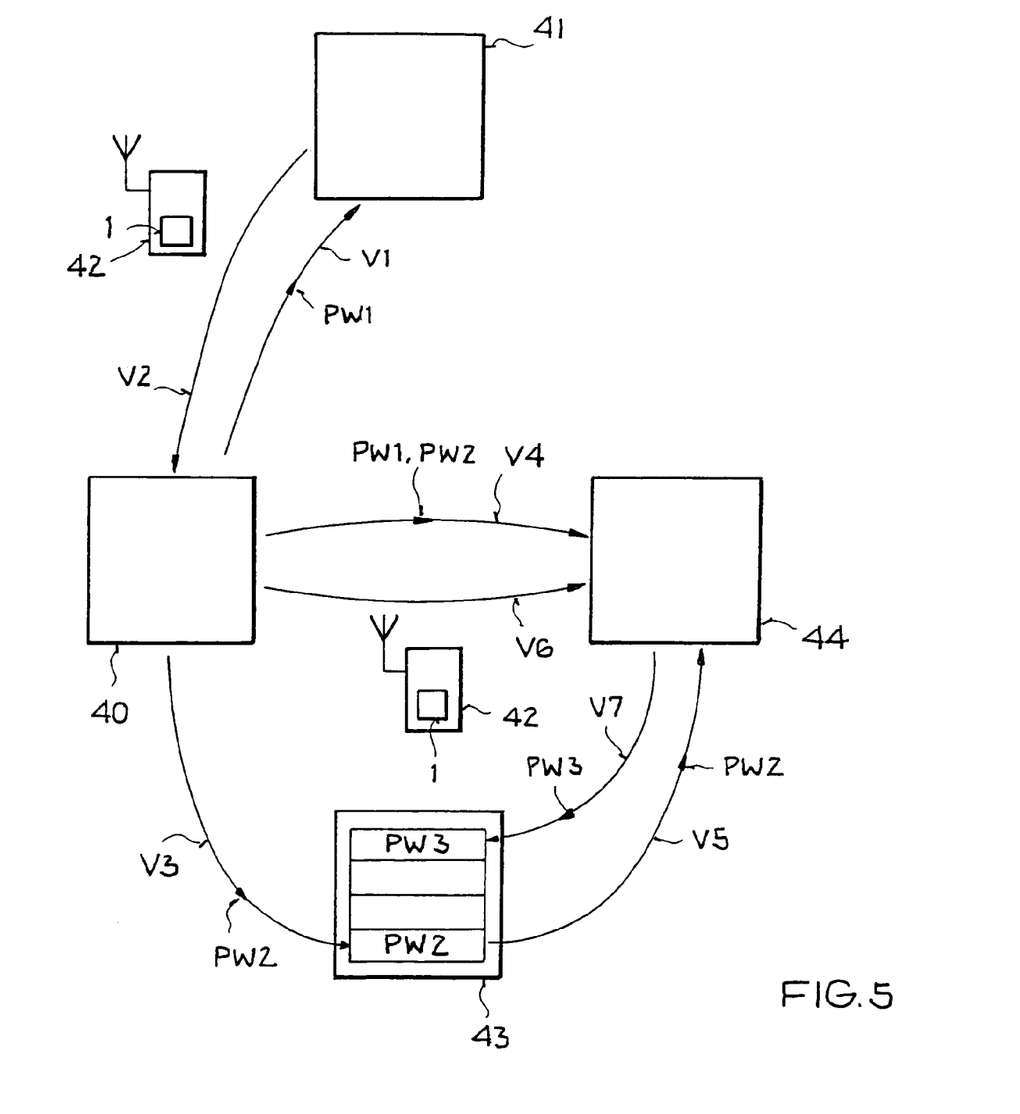
FIG. 5 is a schematic of a system of the invention and/or a data communication system according to an example embodiment of the present invention.

FIG. 5 shows a schematic block diagram for describing an example of using the system of the invention and/or a data communication system of the invention.

In FIG. 5, reference character 40 designates an authorized user and reference character 41 a manufacturer of transponders. The authorized user 40 determines from a second password PW2, which only he knows, a first, open password PW1, which he divulges to the manufacturer 41 (V1). In addition, the manufacturer 41 is informed of the specific configuration of the transponder desired by the authorized user 40. The manufacturer 41 now produces for the authorized user 40 a plurality of transponders 42, which have a security device 1 of the invention, according to the specifications provided by the authorized user 40 and according to the first, open password PW1 (V2). Only the authorized user 40 is now capable of utilizing the security device 1 of the invention in his transponders 42 according to certain requirements therefor.

Further, a central database 43 can be provided. The authorized user 40 now stores the second password PW2 known only to him in this central database 43 (V3). In this manner, other users 44 can also operate the security device 1, configured by the authorized user 40 by means of the second password PW2, provided they know the second password PW2 and, if necessary, the first password PW1. This is possible, for example, if the authorized user 40 has divulged the specific password PW2 to the additional users 44 (V4) or made it possible for them to read this password PW2 from the central database 43 (V5). The additional users 44 can now read, for example, via the Internet the second password PW2 from the central database 43 or determine it in another manner (V5), provided they were given the appropriate access information by the authorized user 40 (V4).

In addition, the specific transponders 42 or the objects equipped with these transponders 42 can be transferred from the authorized user 40 to another user 44 (V6), for example, when they are sold. In this case, simultaneously with the transfer (V6) of the transponders 42 and/or the corresponding items, which have these transponders 42, the first, open password PW1 and the second, secret password PW2 are divulged to the additional user 44 (V4). This user 44 is now the new authorized user 44.

The new authorized user 44 is now capable of changing the second, secret password PW2. The new authorized user 44 now determines a secret password PW3, which only he knows, from the knowledge of the specific connection of the security device 1 and the first and second passwords PW1, PW2. The new authorized user 44 changes the security constellation in the security device 1 by using the new secret password PW3 and by the appropriate modification of the new open password, to prevent in this way the former authorized user 40 from still having access to the security device 1 in the transponders 42 or divulging the corresponding passwords PW1, PW2 to other unauthorized users. In this case, the former authorized user 40 is now no longer authorized, because he does not know the new password PW3, and thus also can no longer operate the security device 1 in the corresponding transponders 42 according to their requirements. The new authorized user, in turn can now store this third secret password PW3 in the central database 43 (V7).

The method forming the basis for the security device of the invention for installing a kill and/or cloak function at the protocol level will now be described briefly below:

Security elements such as, for example, a CRC checksum are used in the protocol of data transmission to secure the transmission links against falsification of the data stream. This CRC register is used for the forward link and also for the return link. For this purpose, as a rule, the security device is initialized at the beginning of the specific link.

If a data stream is now transmitted from a base station to the transponder, the transponder calculates a CRC checksum with the help of a CRC register. After the transmission of the actual data, the base station transmits either the CRC checksum it calculated or the inverse value of the CRC checksum. If the CRC checksum is sent, the end value of the CRC register is 0. If the inverse CRC checksum is transmitted, a certain but constant remainder which is not equal to 0 always results. If the end result is valid, the command is accepted.

The kill command is used in the sense that it triggers a programming of the memory or a cell or an area of the memory. The difference in regard to conventional programming, however, is that the base station does not transmit any programming instruction but a kill instruction. Another difference is that the transponder in fact calculates a CRC checksum, but this is not used as a test criterion for carrying out the kill instruction. Rather the result of a certain step or a signal of the CRC register is used as an operand for a subsequent comparison. Here, the new operand is compared with a place in the memory (equality). If this equality is present, then the checking of the next bit is released. If the end of the comparison is reached, it is then checked whether the comparison was successful. If the comparison was successful, the programming of the memory is released. If the comparison was not successful, the procedure (programming) with the longest programming time is carried out so that this only takes time but programming does not occur.

This procedure ensures that the base station can check whether the appropriate bit was set in the memory.

This bit, however, has an effect only after the programming with a subsequent single reading. This is also the so-called default setting, because the programming instruction allows a direct reading according to the programming, without a read instruction being sent. Moreover, the bit also has an effect after a so-called "reset" of the circuit or a portion of the circuit. In this case, the bit is read and blocks, for example, the RSSI receiving circuit of the transponder, so that the transponder now can longer receive any data.

This ensures that the manufacturer knows only a part of the secret. He knows which site of the CRC register is used as the operand. Furthermore, he knows the end criterion of the protocol, which is ultimately the same for all instructions and thereby is not a secret, other than what was agreed upon with the customer, for example, that the value of the bit pointer, therefore the pointer to the appropriate place in the memory, is also checked and incorporated into the results, which leads to the release of the programming. As a rule, however, a minimum length of the specific password is agreed upon.

It can also be agreed with the authorized user how often this procedure must be performed, because, for example, another bit or memory area is programmed with each kill instruction. The transponder after the reset must then form only the sum from all bits or use another comparison criterion agreed upon with the customer.

Depending on the specific kill instruction or the parameter block transmitted with it, the precise location of the tap in the CRC register can also be defined, which signifies further flexibility and thus further increased protection. It is also conceivable that several states of the CRC register or the LFSR hardware necessary for the check, for example, a "modulo-1" adder, are supplied. The output of this adder is then the relational operator.

The described solution is very flexible and allows every authorized user to reach an agreement with the manufacturer on the direct execution of the kill instruction. The same actual kill mechanism can be selected for all manufacturers and authorized users. What is different and/or can be different is only the data stream itself and the number of bits and/or kill instructions to be transmitted.

A significant advantage of the method is that the authorized user can himself determine the goal of the comparison, thus, the starting address and if necessary the end address in the memory.

Another advantage is that the number of data can be variable, unless something else was agreed upon, so that a multitude of different implementations are possible.

Very long passwords are also possible because the bit pointer in the memory can be equipped with an auto decrement or an auto increment functionality. The memory itself forms this limit for the password. In addition, the content of the memory must be known at least to the authorized user. This can be achieved, however, if the memory area is first read to communicate the data, for example, via the Internet to the authorized user. This authorized user can calculate the second, secret password from the data and transmit it. It is thus also possible to support variable transponder-related passwords.

If the piece of data, which is transmitted to the authorized user, is an identification code, then additional information can also be transmitted to the authorized user, such as, for example, the value that the start pointer (for example, to the second, secret password) must have, because the CRC register is also affected by this information.

Another possibility arises if the actual protocol structure for this kill instruction is changed. The forward link VL of an information packet 21 is defined by the header section 22, the middle section 23, and the end section 24. The middle section 23 contains a command field 25, possibly other data such as parameters, addresses, and operands, such as, for example, for the comparison or for programming. Furthermore, the middle section 23 can contain a CRC protection field 26. This CRC protection field 26, however, can be omitted, because the CRC register itself is not checked by the CRC protection field 26. Rather, the CRC protection field 26 can only be used as a calculation unit to determine a second operand, thus, the CRC checksum.

Another option arises if the end section 24 is used as well. In particular, the end section 24 can be regarded as a second protocol level in the compilation of the second, secret password, because an expansion of the second, secret password is possible here also. Furthermore, the precise position of the second, secret password, which is transmitted in the end section 24, can also be incorporated into the final release of the programming. It is also advantageous that the second, secret password in the end section 24 begins with a code, so that it can be differentiated from other instructions, which are also transmitted in the end section 24.

Further, it is possible that the pointer address is changed in the end section 24 by an instruction, whereby an instruction in the end section 24 designates a different instruction than at the beginning of the forward link VL. Here an almost 2-bit instruction is possible, which in its coding at least states that this is an expansion of the kill functionality. This 2-bit instruction can be configured as follows, for example:

00: Adjustment of the transponder oscillator, prescaling follows
01: Kill instruction follows
10: Instruction for the active transponder follows
11: Reserved for further use It is possible furthermore that in this procedure a random number is provided, which is determined in the transponder and communicated to the base station. The password can be changed by the random number with each access to the security device. This ensures that unauthorized access is made more difficult, because the random result is a component of a method of the invention and thereby the second, secret password changes inevitably after each new unauthorized access.

In a very advantageous embodiment of the invention, according to a specific instruction sequence, one or more bits can be stored or deleted in a memory, which indicates that the transponder is to be deactivated. Deletion is advantageously an option here, because it corresponds to the "original state" and "data retention" problems are not known here.

Although the present invention was described above with reference to a preferred exemplary embodiment, it is not limited thereto but can be modified in many ways.

In particular the invention is not limited exclusively to RFID systems, but of course can also be expanded, for example, to item identification. The individual items frequently need not be uniquely identified. It is often also sufficient here that the presence, for example, of a defective item can be ruled out. This is also usually called "non-unique" identification. During operation of the transponder in this regard, it has the function of a remote sensor. The invention therefore also refers explicitly to such sensors, in which a communication is made to read out and write the data of a data carrier or sensor. A temperature sensor, pressure sensor, or the like are mentioned as examples of such so-called remote sensor application.

FIG. 4 presents the structure of the base station and the transponder intentionally in a very simplified way for the sake of clarity. It goes without saying that functional units necessary for data communication between a base station and transponder, such as a demodulator, power supply, synchronization device, decoder, and the like, are of course present in these units. This also applies naturally to the structure of the security device according to FIGS. 1 and 2, which—as has been mentioned above—can be configured to be as complex as desired, depending on the security that this security device is to provide.

Although the invention was described above with the use of a security device for a transponder with a security function designed as a kill and/or cloak function, it is not limited thereto; rather, it can expand to all security functionalities, which have a functionality that is functionally equal or functionally similar to a kill function and/or cloak function. It is only essential that a security function is available for access to the transponder data. Another security function is, for example, a so-called restore lock function. In a security device with a restore lock function, it is possible to overwrite memory areas, which are protected against overwriting (lock function), or alternatively also to overwrite the lock function.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A security device for a transponder, the security device comprising:
   a security function for a kill and/or cloak function;
   a memory device, in which a first password is stored;
   an input, into which a second password can be coupled;
   a cryptologic device, which is connected to the input and generates a checksum from the second password; and
   a comparison device, which compares the checksum and the first password and which, upon their agreement, generates a security control instruction to activate and/or deactivate a security mechanism, which can be tapped at an output.

2. The security device according to claim 1, wherein the cryptologic device is a computational device for calculating the checksum.

3. The security device according to claim 1, wherein the cryptologic device is designed as hardware-based device.

4. The security device according to claim 1, wherein the cryptologic device is a linear feedback shift register.

5. The security device according claim 1, wherein the cryptologic device is a cyclic redundancy check (CRC) register.

6. The security device according to claim 1, wherein the cryptologic device has a plurality of taps through which a signal, which derives the checksum, can be tapped.

7. The security device according to claim 1, wherein a linking device is provided, which is connected to at least one tap of the cryptologic device, which links together signals provided by the cryptologic device at an output side and generates the checksum therefrom.

8. The security device according to claim 7, wherein the linking device has an AND operation and/or an XOR operation and/or an OR operation and/or a modulo operation.

9. The security device according to claim 1, wherein the security function is a kill and/or cloak control instruction, and wherein the security mechanism is a kill and/or cloak control mechanism instruction.

10. A method for configuring a security device of a transponder, the method comprising the steps of:
storing a first password in a memory device;
inputting a second password into an input;
generating a checksum from the second password by a cryptologic device;
comparing the checksum and the first password; and
generating a security control instruction, on the basis of the comparison of the checksum and the first password, to activate and/or deactivate a security mechanism.

11. The method according to claim 10, wherein, to increase security during the operation of the security device, a bit number of the cryptologic device is increased.

12. The method according to claim 10, wherein, to increase security during operation of the security device, the cryptologic device is repeatedly passed through to derive the checksum.

13. The method according to claim 10, wherein, to increase security during operation of the security device, a number of taps of the cryptologic device is increase, through which a signal is tapped to derive the checksum.

14. The method according to claim 10, wherein, to increase security during operation of the security device, a tap of the cryptologic device, through which a signal is tapped to derive the checksum, is used that is tapped from a flip-flop of an Linear Feedback Shift Register (LFSR) register of the cryptologic device.

15. The method according to claim 10, wherein a linking device is provided, which links together signals provided by the cryptologic device at an output side and generates the checksum therefrom, and wherein, to increase security during operation of the security device, a number of operation elements and/or a degree of connectivity of the linking device are increased.

16. The method according to claim 10, wherein a central database is provided, in which the second password is stored and from which the second password can be read by additional users who are authorized by an authorized user of the security device.

17. The method according to claim 10, wherein the second password is changed and a changed checksum, which is then stored as a new first password in a memory device, is determined from the changed second password by the cryptologic device and/or a linking device.

18. The method according to claim 17, wherein the second password is changed after a predetermined number of accesses to the security device or after each access to the security device.

19. The method according to claim 17, wherein the second password is changed automatically with the use of a random number.

20. A method for operating a transponder having a security device, the transponder having a first password stored therein, the method comprising the steps of:
transmitting from a base station to the transponder a high-frequency electromagnetic carrier signal;
modulating an information packet onto the high-frequency electromagnetic carrier signal, the information packet having a header section, a middle section, and a terminating end section;
providing a second password at a predetermined position within the information packet; and
operating the security device of the transponder on the basis of a comparison of the first password with a checksum, which is derived from the second password.

21. The method according to claim 20, wherein the middle section has a data field with at least one instruction to be transmitted to the transponder and a security field, which follows the data field, to secure the data transmitted in the data field, and wherein the second password is inserted in the security field.

22. The method according to claim 20, wherein the terminating end section has at least two End Of File (EOF) symbols, which indicate an end of the information packet, and wherein an additional field, in which the second password is inserted, is placed between the two EOF symbols.

23. A transponder for data communication with at least one base station, the transponder comprising:
a transmitting/receiving device for receiving high-frequency carrier signals from a base station;
a control device, which controls the data communication with the base station; and
a security device, the security device comprising:
a memory device, in which a first password is stored;
an input, into which a second password can be coupled;
a cryptologic device, which is connected to the input and generates a checksum from the second password; and
a comparison device, which compares the checksum and the first password and which, upon their agreement, generates a security control instruction to activate and/or deactivate a security mechanism, which can be tapped at an output of the security device.

24. The transponder according to claim 23, wherein a CRC register is provided in the security device for verifying the data transmitted during the data communication between the base station and transponder, wherein the CRC register of the security device is also a CRC register of the transponder.

* * * * *